United States Patent [19]

Thorn et al.

[11] Patent Number: 5,360,040
[45] Date of Patent: Nov. 1, 1994

[54] FUEL TANK FILL CONTROL DEVICE

[75] Inventors: John E. Thorn, Sylvania, Ohio; Daniel R. Clayton, Owosso, Mich.

[73] Assignee: Ford Motor Company, Dearborn, Mich.

[21] Appl. No.: 131,224

[22] Filed: Oct. 4, 1993

[51] Int. Cl.5 .......................... B65B 1/04; B65B 3/04
[52] U.S. Cl. ..................................... 141/98; 141/286; 220/86.2
[58] Field of Search ................. 141/54, 55, 56, 98, 141/286, 290; 220/86.2; 137/590, 592; 210/505, 506, 507, 508, 509

[56] References Cited

U.S. PATENT DOCUMENTS

| | | | |
|---|---|---|---|
| 2,010,445 | 8/1935 | Sparks | 220/86.2 |
| 3,016,161 | 1/1962 | Peplin | 220/86.2 |
| 3,762,564 | 10/1973 | Weedon et al. | 210/446 |
| 3,865,270 | 2/1975 | Petersson | 220/86.2 |
| 4,235,263 | 11/1980 | Lake, Jr. | 141/1 |
| 4,274,549 | 6/1981 | Germain | 220/86.2 |
| 4,501,374 | 2/1985 | Robertson | 220/86.2 |
| 4,657,156 | 4/1987 | Uranishi et al. | 220/86.2 |
| 4,760,933 | 10/1988 | Christner et al. | 220/86.2 |
| 4,869,283 | 9/1989 | Oeffling et al. | 220/86.2 |
| 5,111,858 | 5/1992 | Aittama et al. | 141/312 |
| 5,205,938 | 4/1993 | Fiumano et al. | 210/653 |

Primary Examiner—Henry J. Recla
Assistant Examiner—Steven O. Douglas
Attorney, Agent, or Firm—Charles H. Ellerbrock; Roger L. May

[57] ABSTRACT

A fuel tank having a fuel filler pipe, the filler pipe having a first end receiving fuel and a second end communicating with the interior of the tank; and a pervious conduit attached to the second end and extending into the tank below the fuel surface.

12 Claims, 2 Drawing Sheets

FUEL TANK FILL CONTROL DEVICE

BACKGROUND OF THE INVENTION

1. Field of the Invention

The present invention relates to a device for simultaneously reducing the evaporative emissions from a fuel tank and the control of fuel travelings between the tank and the fuel filler pipe.

2. Description of the Related Art

The present invention is intended to simultaneously address two areas of automotive fuel hank design. The first area is the unwanted release of liquid fuel from a fuel system during refueling. The second area is a reduction in evaporative emissions of fuel vapor during refueling.

Automotive fuel tanks contain a fuel filler pipe which receives fuel from a fuel nozzle. Automatic fuel pump nozzles contain sensors to sense an increased pressure within the fuel filler pipe. When some automotive fuel tanks are over-filled or filled too quickly, the fuel pump abruptly shuts the flow of fuel and causes a condition commonly referred to as "spit-back". Spit-back is the term used to describe fuel exiting the fuel filler pipe and possibly the fuel inlet door. Spit-back is caused by an increased pressure within the fuel tank being relieved through the fuel filler pipe rather than the fuel sensing tube.

A variety of devices have been used to reduce spit-back. Commonly used devices include valves, labyrinths and baffles. Valves are opened by the weight of the fuel as it enters the fuel tank. They are generally located at the juncture between the fuel filler pipe and fuel tank interior. The weight of the fuel causes the valve to open and admit fuel. Once the fuel tank is filled, the valve closes to reduce or prevent spit-back. Valves of this type are illustrated in U.S. Pat. No. 4,760,933. It is difficult to adjust the valve opening force without inducing premature fuel shut-off.

Labyrinths and baffles rely on the shape of the fuel return line to reduce spit-back. An example of a baffle design is illustrated in U.S. Pat. No. 4,274,549. Labyrinth construction is generally more complicated to fabricate and requires more space within the fuel tank.

The other object of the invention is to reduce the vapor generated within the tank during refueling. Fuel vapor is generated when liquid fuel impacts either the bottom surface of the fuel tank or the rising level of the fuel within the tank. The speed, angle and force with which the fuel impacts the fuel tank bottom or fuel surface affects the amount of fuel vapor generated during refueling. Although not specifically intended to reduce fuel vapor, the device illustrated in U.S. Pat. No. 4,501,374 reduces the speed and force with which fuel added to a tank impacts the fuel surface. The U.S. Pat. No. 4,501,374 teaches a check valve which extends below the surface of the fuel. Check valves of this type would have the effect of reducing the fuel velocity as it enters the tank.

Problems with this type of check valves is again premature shut-off of the fuel nozzle during refueling. Fuel entering the fuel filler pipe must overcome the closing force of the check valve as well as the force of displacing the fuel within the device below the fuel surface. The level of fuel in the fuel filler pipe often exceeds the level of fuel within the tank. The fuel nozzle senses a change in pressure as little as 0.01 psi to signal the fuel nozzle to shut-off. The rising level of fuel within the fuel filler pipe causes an increased pressure and triggers the fuel nozzle to shut-off before the tank is filled.

SUMMARY OF THE INVENTION

The forgoing problems and disadvantages of the related art are overcome by the present invention which includes a fuel tank having a fuel filler pipe, the filler pipe having a first end receiving fuel and a second end communicating with the interior of the tank; and a pervious conduit attached to the second end and extending into the tank below the fuel surface. The pervious conduit may be made from a variety of materials including a mesh screen of nylon polyamide (PA12) material which is commonly used as an automotive fuel filter. The conduit is attached to a fuel filler pipe, generally above the surface of the fuel liquid when the tank is full. The conduit extends from the fuel filler pipe to a reservoir attached to the fuel tank bottom. The invention permits a small volume of fuel to be directed horizontally a distance into the fuel reservoir to permit engine restarting after the fuel tank has been totally emptied. Fuel travels along the inner and outer surface of the conduit in a generally uniform, laminar stream. It is preferable that the conduit extend to the reservoir bottom to minimize turbulence caused by fuel free-falling and impacting the hard surface of the tank. Laminar flow separates air from liquid and minimizes fuel vapor generation. Because the conduit is pervious, it does not induce premature shut-off due to an increased pressure in the filler pipe. The conduit reduces spit-back by impeding flow of fuel from within the tank through the fuel filler pipe after the fuel nozzle has shut-off.

DETAILED DESCRIPTION OF THE PREFERRED EMBODIMENTS

Figure 1:
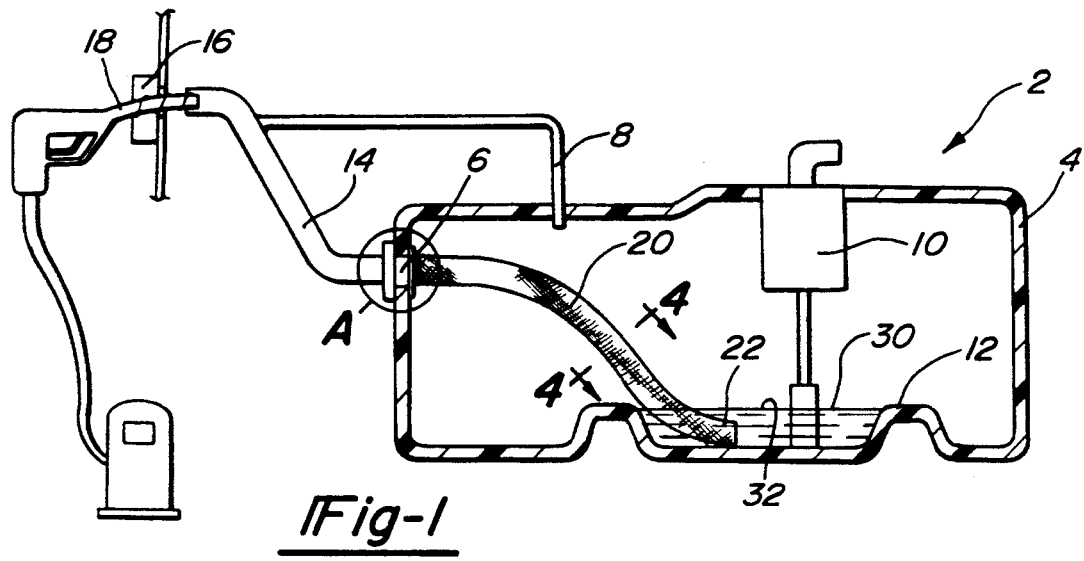
FIG. 1 is a cross-sectional view of a fuel tank assembly undergoing refueling.

Illustrated in FIG. 1 is a cross-sectional view of fuel tank assembly 2 having a fuel tank 4 made from plastic or metal. Fuel tank 4 has a variety of openings receiving devices such as fuel filler pipe 6, sensing tube 8 and fuel delivery module 10. Molded into the bottom surface of tank 4 is reservoir 12. Reservoir 12 is used to concentrate fuel for fuel delivery module 10. Hose 14 connects fuel filler pipe 6 with fuel filler door 16. Sensing tube 8 communicates with hose 14 as shown. Assembly 2 receives fuel from fuel nozzle 18.

Pervious conduit 20 is secured the interior end of fuel filler pipe 6 and extends within tank 4. End 22 of conduit 20 preferably extends within tank 4 a distance sufficient to direct fuel within reservoir 12. Conduit 20 is made in a tubular shape having a circular cross-section diameter approximately equal to that of filler pipe 6. End 22 may be either open or closed.

Figure 2:
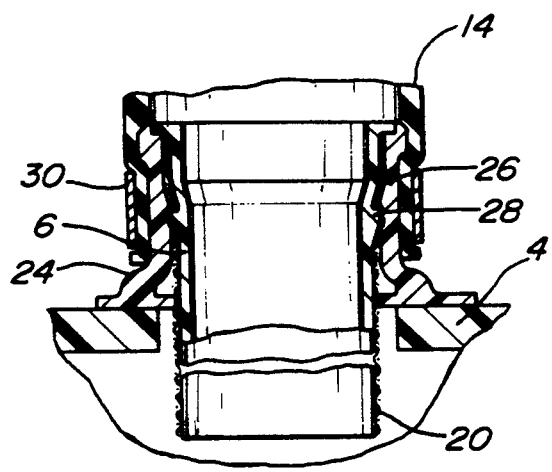
FIG. 2 is an enlarged detail view of area A in FIG. 1.
Figure 3:
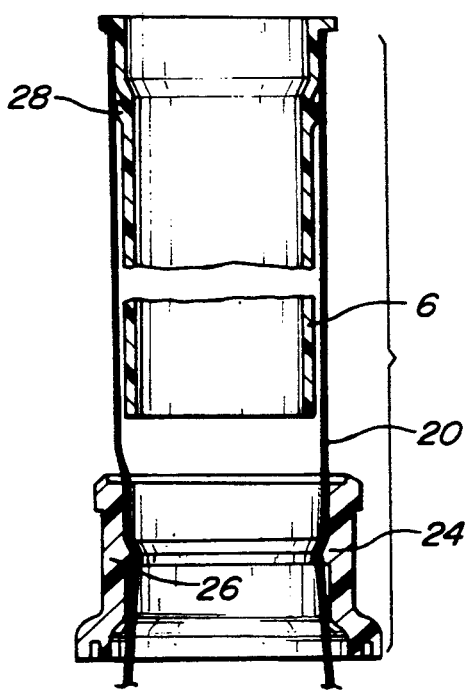
FIG. 3 is an exploded view of an alternate embodiment of the assembly illustrated in FIG. 2.

A detailed sectional view of the region of marked A in FIG. 1 is illustrated in FIGS. 2 and 3. Fuel flange 24 is secured to the outer surface of fuel tank 4. Flange 24 receives conduit 20 and fuel filler pipe 6. Conduit 20 and filler pipe 6 are retained by opposing annular flanges 26, 28. Conduit 20 is retained between flanges 26, 28 and secured firmly to filler pipe 6. A fuel filler pipe of this type is described in U.S. Pat. No. 5,111,845. Hose 14 is secured atop flange 24 by clamp 30.

Conduit 20 is made from a screen, mesh or nonwoven material (as shown in FIG. 3) which freely allows the passage of fuel. Preferred materials for conduit 20 include fuel resistant materials such as nylon (PA12) or SARAN available from Kuss Filtration, Findlay, Ohio, and are commonly used as fuel filters. Conduit 20 may be manufactured from a flat sheet of material and jointed to form a tube or in the alternative, may be formed in a tubular cross-section. Conduit 20 may be made from a screen having a mesh size between 40 and 400 micrometers. As will be described below in detail, the mesh size may be varied to assist in fuel retention within conduit 20. The mesh size and the angle of conduit 20 may be adjusted to prevent fuel from dripping through conduit 20 and free falling within tank 4.

FIG. 1 illustrates refueling a completely empty fuel tank. Fuel nozzle 18 is inserted within fuel filler door 16 and a quantity of liquid fuel 30 is dispensed. Fuel 30 travels through hose 14 and into filler pipe 6. After fuel 30 exits filler pipe 6, it enters conduit 20. As fuel 30 enters conduit 20, a portion is permitted to pass through the mesh. The surface tension between fuel 30 and conduit 20 causes the fuel to be carried both along the interior and exterior wall surface of conduit 20 and finally into reservoir 12. The mesh size of conduit 20 is selected to prevent fuel from prematurely dripping through conduit 20.

Figure 4:
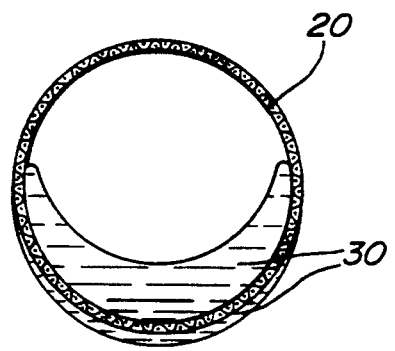
FIG. 4 is a cross-sectional view taken along the line 4—4 in FIG. 1.

Illustrated in FIG. 4 is a cross-sectional view of conduit 20 during refueling. It is believed that the greatest volume of fuel travels inside conduit 20 and a small volume of fuel also travels along the outer surface. As the fuel travels through conduit 20, it is carried into reservoir 12. By directing the fuel into reservoir 12, the invention facilitates placement of reservoir 12 away from fuel filler pipe 6.

It is a general requirement of automotive vehicles to be able to restart an engine with a small volume of fuel once the tank has been completely emptied. This feature generally requires that the reservoir be located beneath or very near the fuel filler pipe. The present invention facilitates an increased horizontal spacing between the fuel filler pipe and reservoir.

Fuel is carried along conduit 20 until it meets the fuel surface 32. Fuel 30 is not permitted to free-fall onto surface 32. Rather, it cascades along the inner and outer surfaces of conduit 20 and spreads evenly along surface 32. Visual inspection of the device during refueling shows that the interface between the fuel being added to the tank and surface 32 is generally free from turbulence. It is this turbulence that increases the fuel vapor within the tank, the fuel vapor must be vented to permit the addition of fuel. The overall amount of fuel in the fuel vapor is reduced with the present invention.

Figure 5:
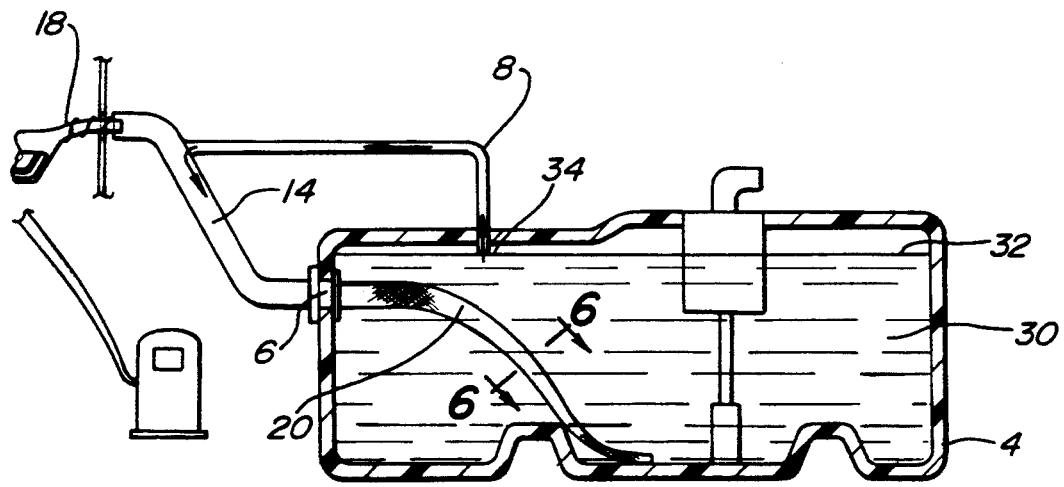
FIG. 5 is a cross-sectional view of the fuel tank after it has been completely filled.
Figure 6:
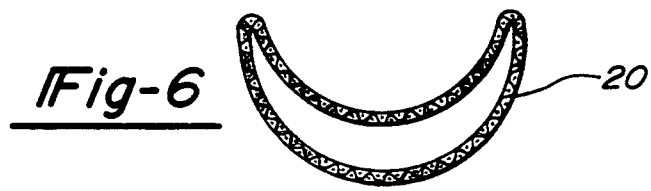
FIG. 6 is a cross-sectional view taken along the line 6—6 in FIG. 5.

The invention reduces spit-back by resisting the back flow of fuel from the fuel tank into the fuel filler pipe as shown in FIGS. 5 and 6. As fuel 30 is added to the tank, fuel surface 32 rises until it reaches fill point 34. When using a top mounted sensing tube 8, fill point 34 becomes the inlet to the sensing tube. When using other designs, the fill point is generally the greatest level at which fuel may be added to a tank. Additional fuel added to tank assembly 2 collects within hose 14 and causes an increased pressure. This increased pressure causes the sensor (not shown) within fuel nozzle 18 to stop the flow of fuel. The fuel within hose 14 travels through filler pipe 6 and conduit 20 into tank 4. The additional fuel causes a temporary pressure rise in the air space above surface 32. The increased pressure causes a partial collapse of conduit 20 as illustrated in FIGS. 5 and 6.

Conduit 20 resists the flow of fuel from within tank 4 through filler pipe 6 and directs the pressure relief through sensing tube 8. Fuel contained within sensing tube 8 is directed through hose 14 and back into tank 4. Spit-back through filler door 16 is greatly reduced. If a tank did not contain conduit 20, fuel would be directed through filler pipe 16 as well as sensing tube 8 because the relative diameter of filler pipe 16 is much greater than the diameter of sensing tube 8. Conduit 20 restricts the flow of fuel sufficient to redirect spit-back through sensing tube 8 rather than filler pipe 6.

Figure 7:
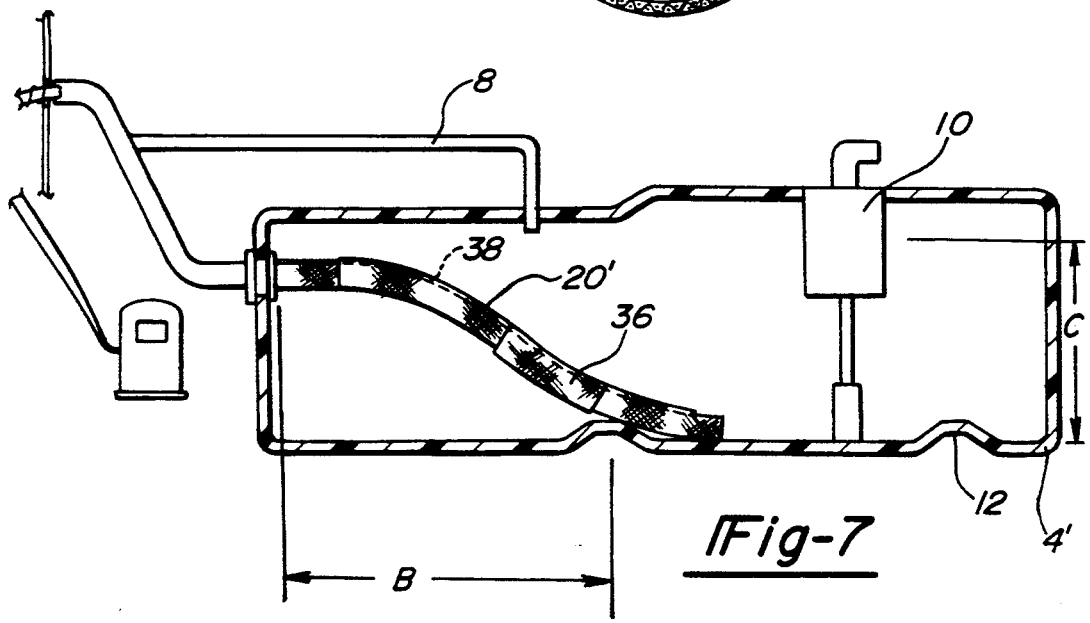
FIG. 7 is a cross-sectional view of an alternative embodiment of the present invention.

FIG. 7 illustrates an alternative embodiment of the present invention. Reservoir 12 is spaced a horizontal distance B from filler pipe 6. This horizontal spacing is greater than the height C of fuel tank 4'. To accommodate this horizontal spacing, conduit 20' may either have a finer mesh size or alternatively may include a solid section 36. By reducing the mesh size, the screen is capable of retaining more liquid in the conduit without dripping and is capable of carrying fuel a greater horizontal distance. In the alternative, a solid section 36 may be added to conduit 20' in areas having a sharp bend or a relatively horizontal run. The solid section may be either a tubular section of hose or a lining applied to the interior or exterior of conduit 20'. Support 38 may optionally be included within conduit 20' to retain conduit 20' in proper position. Support 38 is illustrated as an elongated rod between filler pipe 6 and reservoir 12. Other types of supporting members such as springs or brackets are also suitable.

Greater flexibility in the design and manufacturing of the tank is possible by facilitating the horizontal displacement of reservoir 12 from fuel filler pipe 6. It is desirable to place reservoir 12 as near as possible to the opening for fuel delivery module 10. In the past, this was complicated by placing the reservoir near the filler pipe. Designers are given a greater flexibility in the construction of the fuel tank using the present invention.

The invention has been illustrated as an article which simultaneously reduces vapor created during the refueling of the tank and the amount of spit-back exiting the vehicle. The invention has been illustrated using a flexible conduit made from a screen. Modifications and variations of the construction are possible without parting from the spirit and scope of the following claims.

What is claimed:

1. A fuel tank assembly for liquid fuel, comprising:
   a fuel tank having a filler pipe, said filler pipe having a first end for receiving fuel and a second end communicating with the interior of said tank; and
   a conduit comprised of pervious material attached to said second end and extending into said tank, said conduit having a portion that is at least partially collapsible, wherein the at least partially collapsible portion of said conduit collapses after fuel delivered to said tank reaches a predetermined fill point.

2. The assembly of claim 1, wherein said second end of said filler pipe is above the fuel surface when the tank is full of fuel.

3. The assembly of claim 1, wherein said conduit extends into a reservoir.

4. The assembly of claim 3, wherein said reservoir is spaced a distance from said second end of said filler pipe, whereby said fuel is carried by said conduit said distance.

5. The assembly of claim 4, wherein said conduit further comprises a non-pervious wall section.

6. The assembly of claim 4, further comprising a means supporting said conduit.

7. The assembly of claim 1, wherein said conduit is made from a screen having a mesh size between 40 and 400 micrometers.

8. The assembly of claim 1, wherein said conduit is made from a non-woven fabric.

9. A fuel tank assembly, comprising:

a fuel tank having a fill point, and a bottom mounted reservoir;

a fuel filler pipe having a first end and a second end secured through said tank; and an at least partially collapsible conduit comprised of pervious material secured to said second end of said filler pipe and extending within said reservoir, said conduit communicating fuel from said first end of said filler pipe to said reservoir when said fuel tank is empty, said conduit at least partially collapsing when fuel delivered to said tank reaches said fill point thereby causing an increased pressure within said tank, said conduit resisting the flow of fuel from within said tank through said filler pipe due to the increased pressure.

10. The fuel tank assembly of claim 9, wherein said second end of said filler pipe is above said fill point.

11. The fuel tank assembly of claim 9, wherein said conduit has a length greater than the height of said fuel tank.

12. The fuel tank assembly of claim 9, wherein said conduit is made from a screen having a mesh size between 40 and 400 micrometers.

* * * * *